(12) United States Patent
Miyazaki

(10) Patent No.: US 7,900,671 B2
(45) Date of Patent: Mar. 8, 2011

(54) RUNFLAT TIRE

(75) Inventor: Shinichi Miyazaki, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 332 days.

(21) Appl. No.: 11/604,794

(22) Filed: Nov. 28, 2006

(65) Prior Publication Data

US 2007/0131329 A1    Jun. 14, 2007

(30) Foreign Application Priority Data

Dec. 13, 2005  (JP) .................. 2005-359335

(51) Int. Cl.
B60C 17/00 (2006.01)
B60C 17/04 (2006.01)
B60C 9/02 (2006.01)

(52) U.S. Cl. ......... 152/516; 152/548; 152/552; 152/554; 152/555; 152/556

(58) Field of Classification Search .................. 152/516, 152/548, 552, 554, 555
See application file for complete search history.

(56) References Cited

U.S. PATENT DOCUMENTS

| 4,947,914 A | * | 8/1990 | Noma et al. .................. 152/531 |
| 5,871,602 A | * | 2/1999 | Paonessa et al. .............. 152/517 |
| 6,026,878 A | | 2/2000 | Zhang et al. |
| 6,026,879 A | | 2/2000 | Reuter |
| 6,142,204 A | * | 11/2000 | Omoteda et al. .............. 152/517 |
| 6,237,661 B1 | | 5/2001 | Asano |
| 6,619,354 B1 | * | 9/2003 | Kobayashi et al. ........... 152/517 |

FOREIGN PATENT DOCUMENTS

| EP | 0749854 A1 | 12/1996 |
| EP | 0822105 A2 | 2/1998 |
| EP | 0860302 A2 | 8/1998 |
| EP | 1022163 A2 | 7/2000 |
| EP | 1059346 A1 | 12/2000 |
| EP | 1338440 | * 8/2003 |
| EP | 1577122 A1 | 9/2005 |
| EP | 1683654 A1 | 7/2006 |
| JP | 55-46883 | * 11/1980 |
| JP | 8-337101 | * 12/1996 |
| JP | 11-227426 | 8/1999 |
| JP | 11-227426 A | 8/1999 |
| JP | 11-291725 A | 10/1999 |
| JP | 2000-255209 | * 9/2000 |
| JP | 2000-351307 A | 12/2000 |
| JP | 2005-138759 A | 5/2005 |
| WO | WO-00/01543 A1 | 1/2000 |

* cited by examiner

*Primary Examiner* — Justin Fischer
(74) *Attorney, Agent, or Firm* — Birch, Stewart, Kolasch & Birch, LLP

(57) ABSTRACT

A runflat tire having an improved runflat durability and including sidewall-reinforcing rubber layer 10 having a crescent-shaped cross section disposed axially inward of carcass 6 in sidewall portion 3, wherein the carcass 6 comprises at least one carcass ply 6A in which carcass cords made of an aramid fiber or a polyethylene naphthalate fiber are arranged at an angle of 70 to 90° with respect to the circumferential direction and are covered with a topping rubber.

5 Claims, 6 Drawing Sheets

RUNFLAT TIRE

BACKGROUND OF THE INVENTION

The present invention relates to a runflat tire having an improved durability in runflat mode, and more particularly to a runflat tire capable of traveling for a relatively long distance in a deflated condition that the tire loses air pressure due to a puncture.

As a runflat tire is known a tire of so-called side-reinforced type wherein a sidewall-reinforcing rubber layer having a crescent-shaped cross section is disposed axially inward (on the tire cavity side) of a carcass which constitutes a tire backbone, in a sidewall portion to thereby support a load applied to a deflated tire so as to enable running in the runflat condition, as disclosed in JP-A-2000-351307. In the runflat tire of this type, a rayon fiber cord which has a good heat resistance is used as a carcass cord in order to secure the durability in runflat mode, since the tire temperature in runflat mode is relatively high as compared with that during normal running in the inflated state.

A necessary minimum durability can be secured by the use of a rayon fiber cord, but further improvement in durability is demanded from the viewpoints of demands for high running speed and long running distance in runflat mode.

Accordingly, it is an object of the present invention to provide a runflat tire having an improved durability in runflat mode.

This and other objects of the present invention will become apparent from the description hereinafter.

SUMMARY OF THE INVENTION

It has been found that when an aramid fiber cord and/or a polyethylene naphthalate (PEN) fiber cord are used as a carcass cord to thereby improve the heat resistance of the carcass cord, and further when the twisting structure of these fiber cords is specified, while sacrificing a high elasticity of these fiber cords, to thereby improve the fatigue resistance of the cords, the runflat durability of runflat tires can be improved.

In accordance with the present invention, there is provided a runflat tire including a carcass which extends from a tread portion to each of bead cores of bead portions through sidewall portions, a belt layer disposed radially outward of the carcass in the tread portion, and a sidewall-reinforcing rubber layer which is disposed axially inward of the carcass in the sidewall portion and which has a cross section of such a crescent-shape that it has the maximum thickness at a center portion thereof and extends radially inward and outward from the center portion with decreasing its thickness, wherein the carcass comprises at least one carcass ply in which carcass cords made of an aramid fiber or a polyethylene naphthalate fiber are arranged at an angle of 70 to 90° with respect to the circumferential direction and are covered with a topping rubber.

It is preferable that the carcass cord has a three-strand structure that three bundles of first-twisted filaments are final-twisted, and the three-strand cord has a twist factor T of 0.5 to 0.7 represented by the equation: $T = N \times \sqrt{\{(0.25 \times D/2)/\rho\}} \times 10^{-3}$ in which N is the number of first twists per 10 cm, D is a total nominal dtex of a cord (fineness), and $\rho$ is a specific gravity of a cord material.

It is also preferable that the topping rubber of the carcass cord has a complex modulus E* of 7 to 13 MPa.

The runflat tire of the present invention has an improved durability in runflat mode.

The term "standard rim" as used herein means a rim defined for every tire in a standardizing system on which the tire is based and, for example, denotes "standard rim" in JATMA, "design rim" in TRA and "measuring rim" in ETRTO. Also, the term "normal internal pressure" as used herein means an air pressure defined for every tire in a standardizing system and, for example, denotes the maximum air pressure in JATMA, the maximum value recited in the table of "Tire Load Limits at Various Cold Inflation Pressures" in TRA, and the "Inflation Pressure" in ETRTO, provided that in case of tires for passenger cars, the "normal internal pressure" is 180 kPa.

Further, the term "complex modulus" (or "complex elastic modulus") as used herein denotes a value measured with a viscoelasticity spectrometer under the conditions of measuring temperature 70° C., initial tension 450 g, frequency 10 Hz, and dynamic strain ±0.03%.

The term "hardness" as used herein means a shore A hardness measured by a durometer type A at 23° C.

DETAILED DESCRIPTION OF THE INVENTION

An embodiment of the present invention will now be explained with reference to the accompanying drawings.

Figure 1:
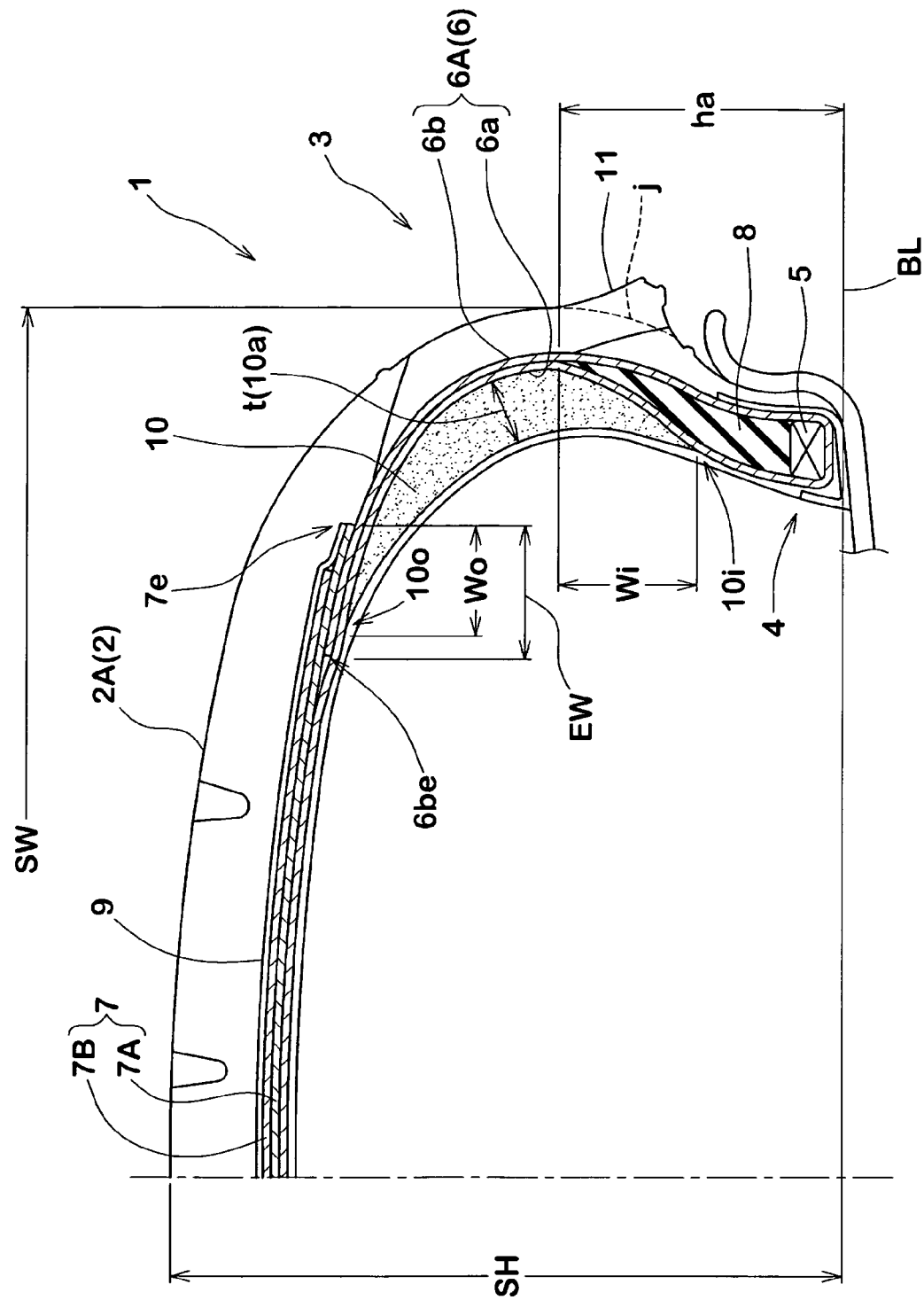
FIG. 1 is a cross sectional view of a runflat tire illustrating an embodiment of the present invention.

FIG. 1 is a meridian section view illustrating a runflat tire of the present invention in the normal internal pressure condition. In FIG. 1, runflat tire 1 in this embodiment includes, at the least, a carcass 6 that extends from a tread portion 2 to each of bead cores 5 in opposing bead portions 4 through sidewall portions 3, a belt layer 7 that is disposed radially outward of the carcass 6 in the tread portion 2, and a sidewall-reinforcing rubber layer 10 that is disposed axially inward of the carcass 6 in the sidewall portion 3.

The carcass 6 comprises at least one carcass ply 6A (in this embodiment, single carcass ply) in which carcass cords are disposed at an angle of 70 to 90° with respect to the tire circumferential direction and covered with a topping rubber. The carcass ply 6A is composed of a main body portion 6a that extends from one bead core 5 to the opposing bead core 5, passing through the crown region of the tire, and turnup portions 6b that are continuous with the main body portion 6a and are turned up around the bead cores 5 from the axially inside to the axially outside of the tire to thereby anchor the carcass ply.

A bead apex rubber 8 for reinforcing the bead portion is disposed radially outward of each bead core 5 and between main body portion 6a and turnup portion 6b of the carcass ply to radially outwardly extend from the bead core 5 in a tapered manner. Preferably, the bead apex rubber 8 is made of a hard rubber having a shore A hardness of 65 to 95 measured by a durometer type A at 23° C. The section height "ha" of the bead apex rubber 8 (radial distance) from a bead base line BL to the tip of the bead apex rubber 8 is not particularly limited. However, if the height of the bead apex rubber 8 is too small, the durability in runflat mode may be deteriorated, and if the height is too large, the tire weight may excessively increase or the ride comfort may be deteriorated. Therefore, it is preferred that the height "ha" of the bead apex rubber 8 is from 10 to 60%, especially about 20 to about 40%, of the section height SH of the tire.

Figure 3:
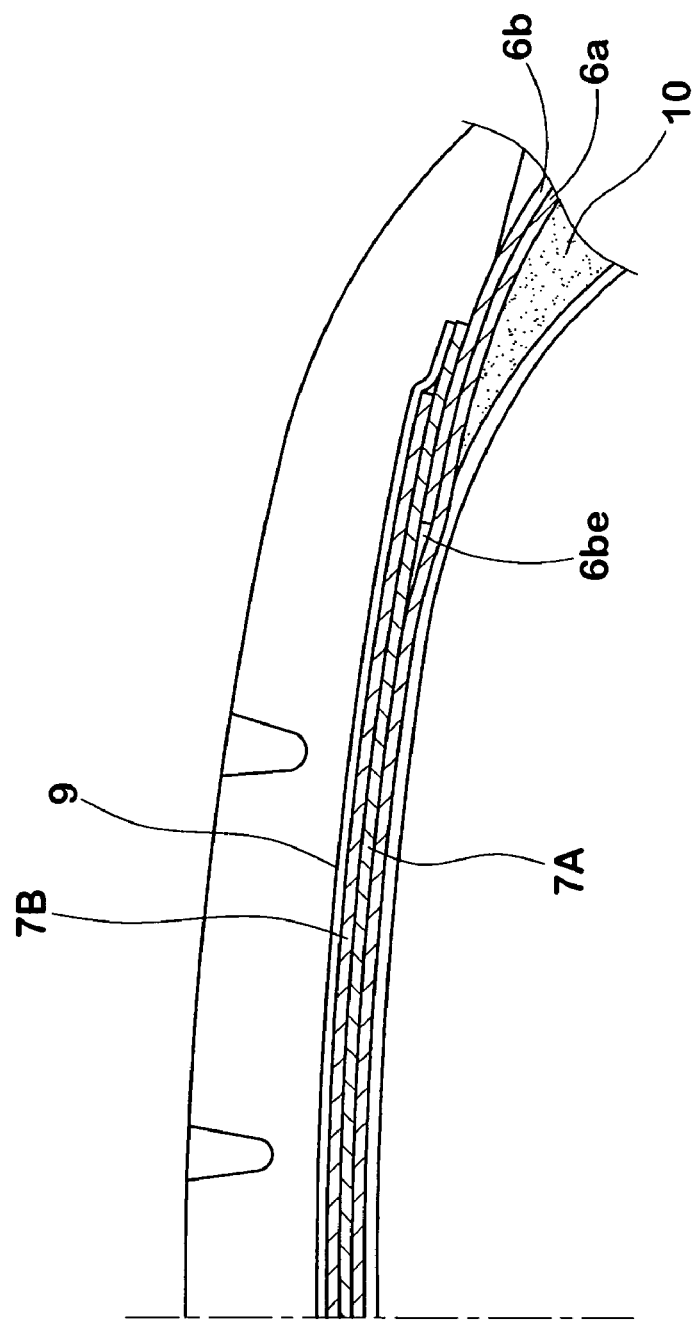
FIG. 3 is a partial cross sectional view illustrating a tread portion in an enlarged form of the tire shown in FIG. 1.

In this embodiment shown in FIG. 1, the carcass ply 6A has a so-called high turnup structure wherein the turnup portion 6b extends radially outwardly beyond the radially outer end of the bead apex rubber 8 and terminates at an axially edge portion of a belt layer 7 in such a manner that the outer end 6be of the turnup portion 6b is sandwiched between the ply main body portion 6a and the belt layer 7, as shown in FIGS. 1 and 3. This structure can effectively reinforce the sidewall portion 3 by the use of a single carcass ply. Also, since the outer end 6be of the ply turnup portion 6b is located apart from the sidewall portion 3 that is greatly bent in runflat condition, damages occurring from the outer end 6be can be suitably suppressed. The axial width EW of the overlapping part of the turnup portion 6b with the belt layer 7 is preferably at least 5 mm, more preferably at least 10 mm, and it is preferably at most 25 mm from the viewpoint of weight reduction. In case of forming the carcass 6 using a plurality of carcass plies, it is preferable that at least one carcass ply has such a high turnup structure.

The sidewall-reinforcing rubber layer 10 has a cross section of such a crescent-shape that it has the maximum thickness at its center portion 10a and extends radially from the center portion to both the radially inner end 10i and the radially outer end 10o with gradually decreasing the thickness, respectively. The inner end 10i is located radially inside the radially outer end of the bead apex rubber 8, and the outer end 10o is located axially inside an axially outer end 7e of the belt layer 7. It is preferable that the radial width Wi of an overlapping part of the sidewall-reinforcing rubber layer 10 with the bead apex rubber 8 is from 5 to 50 mm, and the axial width Wo of an overlapping part of the sidewall-reinforcing rubber layer 10 with the belt layer 7 is from 0 to 50 mm, whereby occurrence of a difference in rigidity between the outer and inner ends 10o and 10i of the reinforcing rubber layer 10 is controlled.

The sidewall-reinforcing rubber layer 10 is disposed axially inward of the main body portion 6a of the carcass 6 and, therefore, when the sidewall portion 3 is subject to a flexural deformation, mainly a compressive load acts on the sidewall-reinforcing rubber layer 10 and a tensile load acts on the carcass ply 6A which includes a cord material. Since a rubber material is resistant to the compressive load and a cord material is resistant to the tensile load, the configuration as mentioned above of the sidewall-reinforcing rubber layer 10 can efficiently enhance the flexural rigidity of the sidewall portion 3, thus effectively decreasing a vertical flex of a tire in runflat mode.

It is preferable that the sidewall-reinforcing rubber layer 10 has a shore A hardness of at least 60, especially at least 65. If the hardness is less than 60, the compressive strain in runflat mode is large, so sufficient runflat performances are not obtained. If the hardness is too high, the longitudinal spring constant of a tire excessively increases to lower the ride comfort. From such points of view, it is preferable that the hardness of the sidewall-reinforcing rubber layer 10 is at most 80, especially at most 75.

The maximum thickness "t" of the sidewall-reinforcing rubber layer 10 is suitably selected depending on tire size, kind of the tire and the like. In case of tires for passenger cars, the maximum thickness "t" is usually from 5 to 20 mm.

The belt layer 7 comprises a plurality of belt plies (in this embodiment, two belt plies 7A and 7B) in each of which belt cords, e.g., steel cords, are arranged at an angle, for example, of 10 to 35° with respect to the tire circumferential direction and covered with a topping rubber. The belt plies are stacked so that the belt cords in one ply crosses the cords in the other belt ply, whereby the rigidity of the belt is enhanced to reinforce the tread portion 2 by a hoop effect.

In order to enhance the high speed durability, a band layer 9 in which a band cord of an organic fiber such as nylon is spirally wound at an angle of 5° or less with respect to the circumferential direction, may be disposed radially outward of the belt layer 7.

Figure 2:
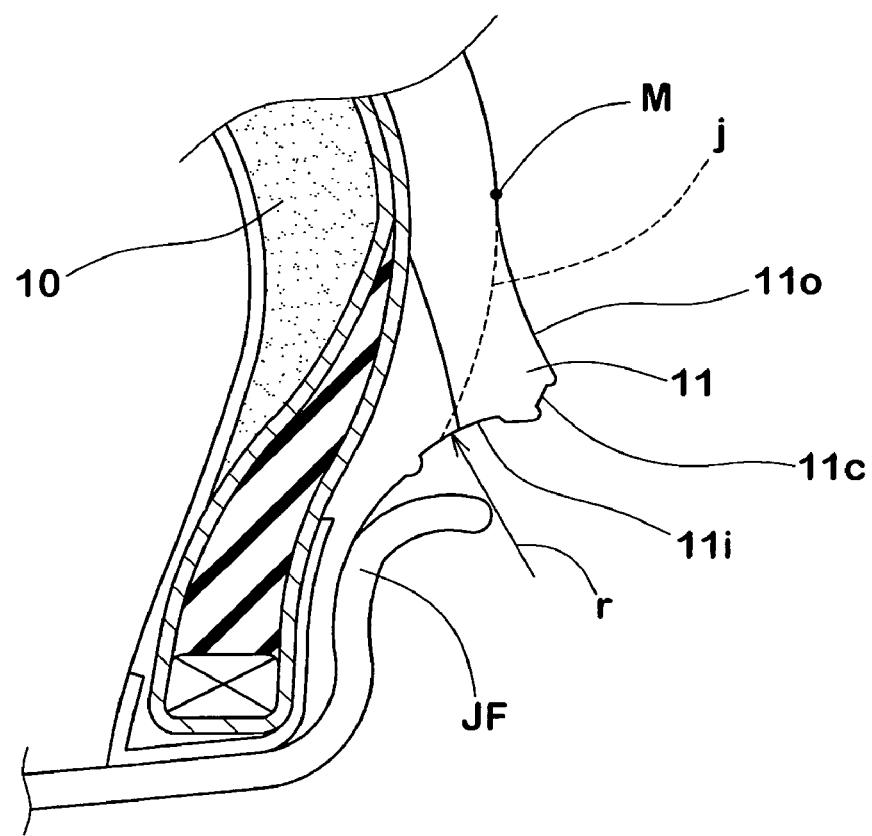
FIG. 2 is a partial cross sectional view illustrating a bead portion in an enlarged form of the tire shown in FIG. 1.

A rim-protecting rib 11 may be convexly disposed in the bead portion 4, as shown in FIGS. 1 and 2. The rim-protecting rib 11 is, as shown in FIG. 2, a rib projecting from a base profile line "j" to cover a rim flange JF. It has an approximately trapezoidal cross section which is enclosed by a projecting face (top face) 11c which projects most axially outwardly, a radially inner slope 11i which smoothly continues from the top face 11c to the axially outer surface of the bead portion, and a radially outer slope 11o which smoothly continues from the top face 11c to the base profile line "j" in the vicinity of a tire maximum width point M. The radially inner slope 11i is a concave arc-like face having a larger radius "r" of curvature than an arc-like portion of the rim flange JF, and serves to protect the rim flange JF from stones in normal running condition. It also serves to decrease the vertical flex of tire, thus improving the runflat performances and the runflat durability, since the radially inner slope 11i will contact the rim flange JF with leaning against the arc-like portion of the rim flange JF.

In the present invention, a cord made of an aramid fiber and/or a cord made of a polyethylene naphthalate fiber are used as a carcass cord in order to improve the runflat durability.

These carcass cords have a sufficient heat resistance, but tend to be inferior in fatigue resistance owing to high elasticity. Therefore, it is difficult to sufficiently enhance the runflat durability by mere use of these heat resistant fibers.

It has been made possible to improve the fatigue resistance, thus significantly improving the runflat durability as compared with conventional rayon cords, by adopting for these carcass cords a twist factor of such a high level that it has not been usually employed, and/or by adopting a three strand structure instead of a two strand structure which is usually employed.

In this embodiment, the runflat durability is improved by using a carcass cord of a three-strand structure having a twist factor T of 0.5 to 0.7.

Figure 4:
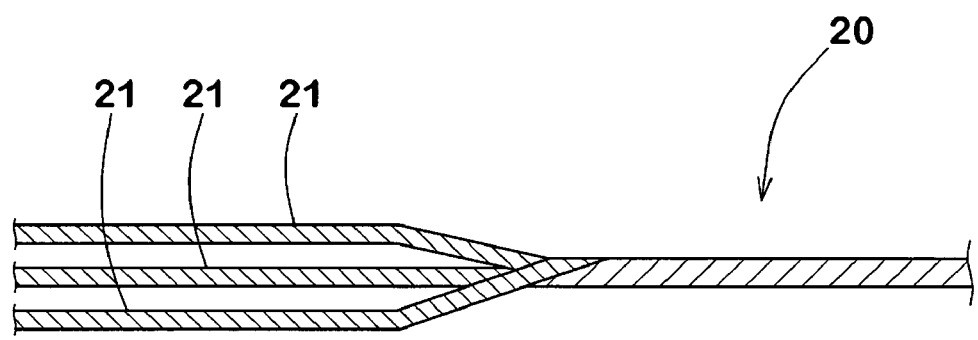
FIG. 4 is side view illustrating a carcass cord.

That is to say, as shown in FIG. 4, the carcass cord 20 has a three-strand structure that three bundles 21 (three strands 21) of first-twisted filaments are final-twisted. In case of such a three-strand structure, a larger twist amount can be obtained as compared with a conventional two-strand structure even if the number of twists is the same, whereby the flexibility of the cord can be increased to improve the fatigue resistance. The twist amount can be further increased without changing the twist structure by increasing the twist factor T, whereby the flexibility of the cord can be further increased to further improve the fatigue resistance.

A so-called balanced twisting that the number of first twists is the same as the number of the final twists is applied to the three strand structure mentioned above. The twist factor T is represented, as well known, by the following equation (1):

$$T = N \times \sqrt{\{(0.125 \times D/2)/\rho\}} \times 10^{-3} \quad (1)$$

in which N is the number of first twists of cord per 10 cm, D is a total nominal dtex of single cord (fineness), and ρ is a specific gravity of a cord material.

In case of conventional cords made of an aramid fiber or a polyethylene naphthalate (PEN) fiber, those having a two strand structure and a twist factor T of about 0.45 or less are used as a carcass cord in order to exhibit a good reinforcing effect by utilizing a high elasticity which is an important property of aramid and PEN fiber cords. In contrast, in the present invention, the high elasticity is not utilized, but other property, namely excellent heat resistance, of the aramid and PEN fiber cords are utilized. That is to say, a fatigue resistance which is particularly required for runflat tires which are greatly deformed in runflat mode is secured by changing the twisting structure and the twist factor T so as to increase the twist amount on a high level as compared with the conventional carcass cords, while venturing to sacrifice the important property, high elasticity, of these fiber cords.

If the twist factor T of the carcass cord 20 is less than 0.5, the effect of improving the fatigue resistance is small, so the runflat durability is not sufficiently improved. If the twist factor T is more than 0.7, the twist processing becomes difficult, so it is industrially disadvantageous. It is preferable from the viewpoint of runflat durability that the twist factor T is 0.6 or more. If the twist factor T is within the above-mentioned range, a necessary runflat durability can be secured even by an aramid or PEN fiber cord having a two strand structure, but it can be further improved by adopting the three strand structure.

The above-mentioned total dtex D (fineness) of a single cord is not particularly limited, but is preferably from 1,600 to 3,500 dtex.

In this embodiment as shown in FIG. 1, as a topping rubber of the carcass ply 6A is used a rubber having a high elasticity as compared with a conventional carcass topping rubber, i.e., a complex modulus E* of 5.0 to 13.0 MPa. A strain occurring at the carcass cords at the time of deformation of a tire can be decreased, thus further improvement of the runflat durability can be achieved, by using such a high elastic rubber. If the complex modulus E* of the carcass topping rubber is less than 5.0 MPa, the above effect is not expected, and if the complex modulus E* is more than 13.0 MPa, the rubber becomes too hard, so the rubber itself tends to break. Therefore, preferably, the complex modulus E* of the carcass topping rubber is 7.0 MPa or more, and is 13.0 MPa or less. The complex modulus E* of a topping rubber conventionally used for the carcass ply is about 5.7 MPa.

Figure 5:
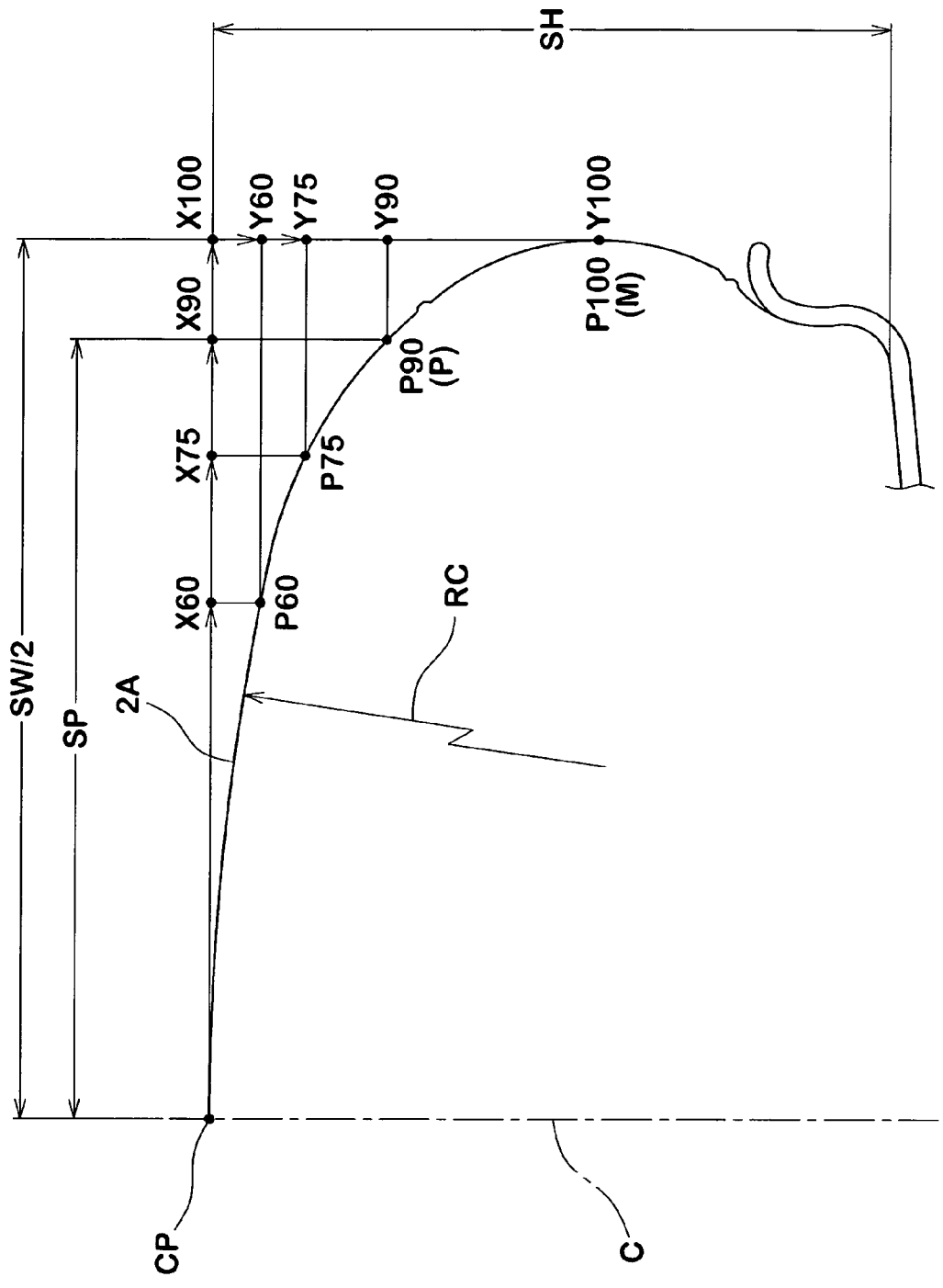
FIG. 5 is a diagram showing a profile of the outer surface of a tire.

The runflat tire 1 in this embodiment has an outer surface 2A of a special profile as proposed in Japanese Patent No. 2994989. That is to say, in the meridian section of tire 1 attached to a standard rim and inflated at a normal internal pressure, the profile line (the outer surface 2A) of the tire 1 is defined as follows:

As shown in FIG. 5, if "P" is a point on the tire outer surface 2A which is apart from the tire equator plane C by a distance SP of 45% of the maximum section width SW of the tire and "CP" is the tire equator point at which the tire equator plane C and the outer surface 2A cross each other, the radius RC of curvature of the tire outer surface 2A is set to gradually decrease from the tire equator point CP to the point P. The "maximum section width SW" of the tire denotes the maximum width on the base profile line "j" of the tire outer surface 2A, and the base profile line "j" denotes a smooth profile line of the outer surface 2A of a tire from which local concave and convex parts such as fine ribs and grooves showing letters, figures and marks for decoration or information, rim-protecting rib for preventing a rim from coming off and side-protecting rib for protecting from a cut.

Further, if P60, P75, P90 and P100 denote points on the tire outer surface 2A apart from the tire equator plane C by distances X60, X75, X90 and X100 of 60%, 75%, 90% and 100% of the half width (SW/2) of the tire maximum section width SW, respectively, and if Y60, Y75, Y90 and Y100 denote radial distances between the tire equator point CP and each of the points P60, P75, P90 and P100 on the tire outer surface 2A, and if SH denotes a section height (radial distance) of the tire inflated at normal internal pressure from the bead base line BL to the tire equator point CP, the radial distances Y60, Y75, Y90 and Y100 satisfy the following equations.

$$0.05 < Y60/SH \leq 0.1$$

$$0.1 < Y75/SH \leq 0.2$$

$$0.2 < Y90/SH \leq 0.4$$

$$0.4 < Y100/SH \leq 0.7$$

Figure 6:
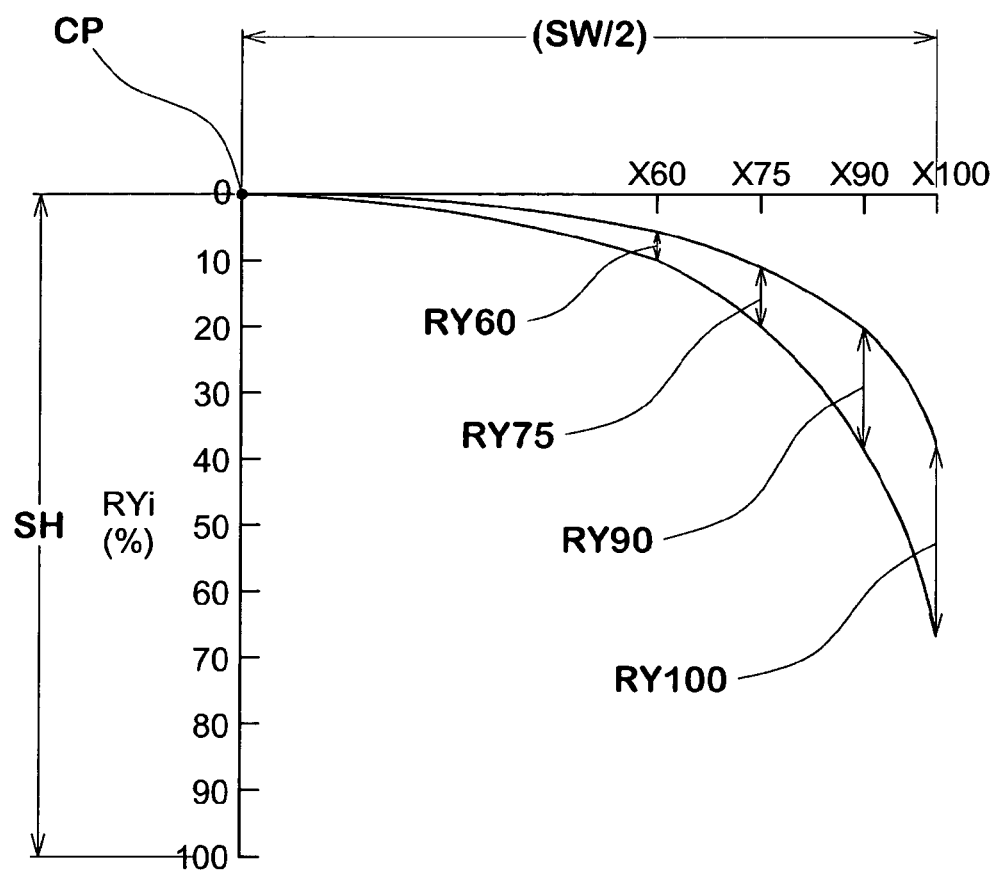
FIG. 6 is a graph showing a relationship between an axial distance from the tire equator plane of a point on a tread profile line (outer surface of tread) and a radial distance from the tire equator point of the point.

Ranges RYi satisfying the above equations are shown in FIG. 6 wherein RY60=Y60/SH, RY75=Y75/SH, RY90=Y90/SH and RY100=Y100/SH.

It is reported in Japanese Patent No. 2994989 that since a tread having a profile satisfying the above equations is very round as shown in FIGS. 5 and 6, the footprint of the tire is in a longitudinally long elliptic shape that the ground contact width is small and the ground contact length is large, and the noise performance and aquaplaning performance can be improved. If the values of RY60, RY75, RY90 and RY100 are less than the above ranges, the tread portion 2 becomes flat and the profile of the tire outer surface 2A approaches a profile of a conventional tire. If they are more than the above ranges, the tread portion 2 has a markedly convex profile and the ground contact width becomes too small, so necessary running performances in normal running operation cannot be secured.

Since the aspect ratio of tire, the maximum section width of tire, the maximum height of tire and the like can be approximately determined from tire standards such as JATMA and ETRTO if the tire size is previously determined, the ranges of RY60, RY75, RY90 and RY100 can be readily calculated. Therefore, the tire outer surface 2A can be suitably determined by depicting it in a smooth curve from the tire equator point CP to the point P mentioned above so as to satisfy the ranges of RY60, RY75, RY90 and RY100 at respective positions and so as to gradually decrease the radius RC of curvature.

It is preferable that the above-mentioned tire has a ground contact width CW (axial distance between axially outermost edges of a footprint formed when a tire contacts a ground) within the range of 50 to 65% of the tire maximum section width SW under conditions of a normal internal pressure and a load of 80% of normal load. If the ground contact width CW is less than 50% of the maximum section width SW, the wandering performance is deteriorated under normal running condition and uneven wear is easy to occur due to uneven ground contact pressure. If the ground contact width CW is more than 65% of the maximum section width SW, the ground contact width is excessively large and it is difficult to simultaneously achieve both of good passing noise performance and good aquaplaning performance.

Since such a special profile has the feature that the region of the sidewall portion is short, the volume of a rubber in the sidewall-reinforcing rubber layer 10 can be decreased and, therefore, weight reduction and improvement in ride comfort of runflat tires can be achieved. On the other hand, the amount of deformation in tread portion 2 having a large rubber volume becomes larger as compared with tires having a usual tread profile. For such tires, the carcass cords having a good heat resistance according to the present invention can exhibit a high effect on improvement of runflat durability.

While a preferable embodiment of the present invention has been described with reference to the drawings, it goes without saying that the present invention is not limited to only such an embodiment and various changes and modifications may be made.

The present invention is more specifically described and explained by means of the following examples. It is to be understood that the present invention is not limited to these examples.

EXAMPLES

Runflat tires (size: 245/40R18) having the structure shown in FIG. 1 were manufactured based on the specifications shown in Table 1 and described below. Other specifications of the tires are substantially common to all tires.

Carcass: single ply, cord angle 90°
Belt layer: two plies, cord angles +18°/−18°
Sidewall-reinforcing rubber layer: hardness 90, maximum thickness 0.9 mm
Tread profile: the same profile which falls within the ranges of RY60=0.05 to 0.1, RY75=0.1 to 0.2, RY90=0.2 to 0.4 and RY100=0.4 to 0.7

The runflat durability of the tires were evaluated by a method described below. The results are shown in Table 1.

<Runflat Durability>

A tire was mounted on a rim (size: 18×8) from which a valve core was removed, and it was run on a drum of a drum tester in the deflated state at a speed of 90 km/hour under a vertical load of 5.74 kN. The running distance up to breaking of the tire was measured. The results are shown as an index based on the result of Comparative Example 1 regarded as 100. The larger the value, the better the durability.

In Table 1, the specific gravities p of cord materials are as follows:
Specific gravity of rayon fiber cord: 1.51
Specific gravity of aramid fiber cord: 1.44
Specific gravity of polyethylene naphthalate (PEN) fiber cord: 1.36

TABLE 1

|  | Com. Ex. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Carcass cord |  |  |  |  |  |  |  |  |  |
| Material | rayon | aramid | aramid | aramid | aramid | aramid | aramid | aramid | aramid |
| Cord constitution | 1840 dtex/2 | 800 dtex/3 | 1100 dtex/3 | 800 dtex/3 | 1100 dtex/3 | 800 dtex/3 | 1100 dtex/3 | 800 dtex/3 | 1100 dtex/3 |
| Number of strands | 2 | 3 | 3 | 3 | 3 | 3 | 3 | 3 | 3 |
| Total nominal dtex of cord (fineness D) | 3680 | 2400 | 3300 | 2400 | 3300 | 2400 | 3300 | 2400 | 3300 |
| Number of twists per 10 cm (first twist/final twist) | 48/48 | 42/42 | 35/35 | 50/50 | 43/43 | 64/64 | 55/55 | 64/64 | 55/55 |
| Twist factor T | 0.5924 | 0.4287 | 0.4189 | 0.5103 | 0.5146 | 0.6532 | 0.6582 | 0.6532 | 0.6582 |
| Number of cords per 5 cm of carcass ply | 51 | 53 | 35 | 53 | 35 | 53 | 35 | 53 | 35 |
| Carcass topping rubber |  |  |  |  |  |  |  |  |  |
| Complex modulus E* (MPa) | 5.7 | 5.7 | 5.7 | 5.7 | 5.7 | 5.7 | 5.7 | 10.3 | 10.3 |
| Runflat durability (index) | 100 | 117 | 115 | 125 | 125 | 127 | 127 | 131 | 133 |

|  | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| Carcass cord |  |  |  |  |  |  |  |  |  |
| Material | PEN | PEN | PEN | PEN | PEN | PEN | PEN | PEN | aramid |
| Cord constitution | 800 dtex/3 | 1100 dtex/3 | 800 dtex/3 | 1100 dtex/3 | 800 dtex/3 | 1100 dtex/3 | 800 dtex/3 | 1100 dtex/3 | 1100 dtex/2 |
| Number of strands | 3 | 3 | 3 | 3 | 3 | 3 | 3 | 3 | 2 |
| Total nominal dtex of cord (fineness D) | 2400 | 3300 | 2400 | 3300 | 2400 | 3300 | 2400 | 3300 | 2200 |
| Number of twists per 10 cm (first twist/final twist) | 42/42 | 35/35 | 50/50 | 43/43 | 64/64 | 55/55 | 64/64 | 55/55 | 44/44 |
| Twist factor T | 0.4411 | 0.4310 | 0.5251 | 0.5295 | 0.6721 | 0.6773 | 0.6721 | 0.6773 | 0.4300 |
| Number of cords per 5 cm of carcass ply | 53 | 35 | 53 | 35 | 53 | 35 | 53 | 35 | 53 |
| Carcass topping rubber |  |  |  |  |  |  |  |  |  |
| Complex modulus E* (MPa) | 5.7 | 5.7 | 5.7 | 5.7 | 5.7 | 5.7 | 10.3 | 10.3 | 5.7 |
| Runflat durability (index) | 117 | 115 | 117 | 115 | 127 | 127 | 131 | 133 | 92 |

|  | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|
| Carcass cord |  |  |  |  |  |  |  |  |  |
| Material | aramid | aramid | aramid | aramid | aramid | aramid | aramid | PEN | PEN |
| Cord constitution | 1670 dtex/2 | 1100 dtex/2 | 1670 dtex/2 | 1100 dtex/2 | 1670 dtex/2 | 1100 dtex/2 | 1670 dtex/2 | 1100 dtex/2 | 1670 dtex/2 |
| Number of strands | 2 | 2 | 2 | 2 | 2 | 2 | 2 | 2 | 2 |

TABLE 1-continued

| | | | | | | | | | |
|---|---|---|---|---|---|---|---|---|---|
| Total nominal dtex of cord (fineness D) | 3340 | 2200 | 3340 | 2200 | 3340 | 2200 | 3340 | 2200 | 3340 |
| Number of twists per 10 cm (first twist/final twist) | 35/35 | 53/53 | 43/43 | 68/68 | 55/55 | 68/68 | 55/55 | 44/44 | 35/35 |
| Twist factor T | 0.4214 | 0.5179 | 0.5177 | 0.6645 | 0.6622 | 0.6645 | 0.6622 | 0.4300 | 0.4214 |
| Number of cords per 5 cm of carcass ply | 35 | 53 | 35 | 53 | 35 | 53 | 35 | 53 | 35 |
| Carcass topping rubber | | | | | | | | | |
| Complex modulus E* (MPa) | 5.7 | 5.7 | 5.7 | 5.7 | 5.7 | 10.3 | 10.3 | 5.7 | 5.7 |
| Runflat durability (index) | 93 | 117 | 115 | 122 | 123 | 129 | 127 | 92 | 93 |

What is claimed is:

1. A runflat tire including
   a carcass which extends from a tread portion to each of bead portions through sidewall portions,
   a belt layer disposed radially outward of the carcass in the tread portion,
   a bead apex rubber disposed in each of the bead portions, and
   a sidewall-reinforcing rubber layer which is disposed axially inward of the carcass in each said sidewall portion and which has a cross section of such a crescent-shape that it has the maximum thickness at a center portion thereof and extends radially inward and outward from the center portion with decreasing its thickness so that the radially inner end portion and radially outer end portion thereof overlap with an axially outer end portion of the belt layer and a radially outer end portion of the bead apex rubber, respectively, wherein
   the carcass consists of a single ply of carcass cords which are made of an aramid fiber and are arranged at an angle of 70 to 90 degrees with respect to the tire circumferential direction and are covered with a topping rubber,
   the carcass cords each have a three-strand structure such that three bundles of first-twisted filaments are final-twisted to have a twist factor T of 0.65 to 0.7, wherein the twist factor T is represented by the following equation (1):

$$T = N \times \sqrt{\{(0.125 \times D/2)/\rho\}} \times 10^{-3} \quad (1)$$

wherein
N is the number of the first twists per 10 cm,
D is a total nominal dtex of a cord, and
ρ is a specific gravity of the cord material,
   said single ply is composed of a main body portion extending between the bead cores and a pair of turnup portions each turned up around the bead core in each said bead portion from the axially inside to the axially outside of the tire,
   said bead apex rubber is disposed radially outside the bead core and between the main body portion and the turnup portion of said single ply, and extends radially outwardly from the bead core in a tapered manner so that the radially outer end thereof has a radial height (ha) in a range of from 10 to 60% of a section height SH of the tire, each measured from a bead base line,
   each said turnup portion extends radially outwardly so that the radially outer end thereof is secured between the ply main body portion and the belt layer, and
the axial width of an overlapping part of the turnup portion with the belt layer is at least 5 mm,
   the radially inner end of said sidewall-reinforcing rubber layer is located radially inside the radially outer end of the bead apex rubber so that the radial width of an overlapping part of the sidewall-reinforcing rubber layer with the bead apex rubber is from 5 to 50 mm, and
   the radially outer end of the sidewall-reinforcing rubber layer is located axially inside the axial outer end of the belt layer so that the axial width of an overlapping part of the sidewall-reinforcing rubber layer with the belt layer is from greater than 0 to 50 mm,
wherein
   the number of the first twists and the number of the final twists of the carcass cords are 55 to 68 per 10 cm, and
   the topping rubber of the carcass cords has a complex modulus E* of more than 10 MPa.

2. The runflat tire of claim 1, wherein the complex modulus E* is not more than 13 MPa.

3. The runflat tire of claim 1 or 2, wherein
   in the meridian section of the tire attached to a standard rim and inflated at a normal internal pressure, the tire has a profile such that the radius of curvature of the tire outer surface gradually decreases from the tire equator point CP to a point P, in which the point P denotes a point on the tire outer surface which is apart from the tire equator plane C by a distance SP of 45% of the maximum section width SW of the tire, and the profile satisfies the following equations:

$$0.05 < Y60/SH \leq 0.1$$

$$0.1 < Y75/SH \leq 0.2$$

$$0.2 < Y90/SH \leq 0.4$$

$$0.4 < Y100/SH \leq 0.7$$

in which Y60, Y75, Y90 and Y100 denote radial distances between the tire equator point CP and each of points on the tire outer surface apart from the tire equator plane C by distances X60, X75, X90 and X100 of 60%, 75%, 90% and 100% of the half width (SW/2) of the tire maximum section width SW, respectively, and SH denotes a section height of the tire.

4. The runflat tire of claim 1, wherein
   the total nominal dtex of each said carcass cord (fineness of cord) is from 2400 to 3300, and
   the number of the carcass cords in the carcass ply is from 35 to 53 per 5 cm.

5. The runflat tire of claim 1, wherein the topping rubber of the carcass cords has a complex modulus E* of 10.3 to 13.0 MPa.

* * * * *